United States Patent
Hu

(10) Patent No.: US 11,183,153 B1
(45) Date of Patent: Nov. 23, 2021

(54) IMAGE DISPLAY METHOD AND DEVICE, ELECTRONIC DEVICE, AND STORAGE MEDIUM

(71) Applicant: BEIJING XIAOMI MOBILE SOFTWARE CO., LTD., Beijing (CN)

(72) Inventor: Yong Hu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/099,490

(22) Filed: Nov. 16, 2020

(30) Foreign Application Priority Data

May 22, 2020 (CN) .......................... 202010439475.6

(51) Int. Cl.
G09G 5/36 (2006.01)
G09G 5/02 (2006.01)
G09G 5/10 (2006.01)
G06T 5/00 (2006.01)
(Continued)

(52) U.S. Cl.
CPC ............... *G09G 5/363* (2013.01); *G09G 5/02* (2013.01); *G09G 5/10* (2013.01); *G09G 2320/066* (2013.01); *G09G 2320/0626* (2013.01); *G09G 2320/0666* (2013.01); *G09G 2340/0407* (2013.01); *G09G 2340/125* (2013.01)

(58) Field of Classification Search
CPC combination set(s) only.
See application file for complete search history.

(56) References Cited

U.S. PATENT DOCUMENTS

2013/0148720 A1  6/2013  Rabii
2015/0029530 A1  1/2015  Asai
(Continued)

FOREIGN PATENT DOCUMENTS

CN  102859480 A  1/2013
CN  109168014 A  1/2019
(Continued)

OTHER PUBLICATIONS

Notice of Allowance of the Chinese application No. 202010439475.6, dated Jul. 2, 2020, 9 pgs.
(Continued)

*Primary Examiner* — Wesner Sajous
(74) *Attorney, Agent, or Firm* — Cooper Legal Group, LLC

(57) ABSTRACT

The present disclosure relates to an image display method and device, an electronic device, and a storage medium. The method includes: when a layer mirroring operation for layer-based mirroring of a display image is detected, a layer mirroring instruction including identification information of a layer to be mirrored is generated; responsive to the layer mirroring instruction, a layer transmission interface is created for the layer to be mirrored; the layer mirroring instruction and information of the layer transmission interface are sent to a graphics composition thread; the graphics composition thread is triggered to send layer data of the layer to be mirrored to a multimedia module based on the identification information of the layer to be mirrored through the layer transmission interface, and the multimedia module renders and merges the layer data of the layer to be mirrored into image video data; and the image video data is output.

16 Claims, 6 Drawing Sheets

(51) Int. Cl.
  *G06T 7/90* (2017.01)
  *G06F 9/451* (2018.01)

(56) References Cited

U.S. PATENT DOCUMENTS

2016/0134895 A1* 5/2016 Suehring ................ H04N 19/44
                                               375/240.01
2018/0330697 A1* 11/2018 Lee ........................ G09G 5/363
2020/0366655 A1* 11/2020 Sun ....................... H04L 9/0894

FOREIGN PATENT DOCUMENTS

CN     109660816 A    4/2019
CN     110969673 A    4/2020

OTHER PUBLICATIONS

"SharedAppVNC", Apr. 2006, XP055803740, Retrieved from the Internet:URL: https://web.archive.org/web/20060408164553/http://shared-app-vnc.sourceforge.net/, 4 pgs.

"How to Find and Install a Color Profile for a More Accurate Monitor on Windows and macOS", Aug. 2, 2017, Chris Hoffman, XP055803749, Retrieved from the Internet:URL : https ://web. archive. org/web/20170802205824 https ://www.howtogeek.com/318723/how-to-find-and-install-a-color-profile-onwindows-for-a-more-accurate-monitor/, 7 pgs.

Supplementary European Search Report in the European application No. 20217836.4, dated Jun. 2, 2021, 10 pgs.

* cited by examiner

IMAGE DISPLAY METHOD AND DEVICE, ELECTRONIC DEVICE, AND STORAGE MEDIUM

CROSS-REFERENCE TO RELATED APPLICATION

This application is filed based upon and claims priority to Chinese Patent Application No. 202010439475.6, filed on May 22, 2020, the entire content of which is incorporated herein by reference.

TECHNICAL FIELD

The present disclosure relates to a processing technology for electronic devices, and more particularly, to an image display method and device, an electronic device, and a storage medium.

BACKGROUND

When an electronic device is used, multiple applications may be often activated. When the electronic device is used for communication with others, particularly during sharing on a remote display screen or live broadcasting using the electronic device, all display images on a screen are displayed to communication objects. However, under many conditions, a user may want fewer than all application display interfaces on the whole screen to be displayed to the communication object, such that only a display image of a related layer is displayed to the communication object, which is favorable for protecting the privacy of the user. However, for screen sharing or live broadcast, a present electronic device does not support application selection and displaying of only a selected display image to the communication object.

SUMMARY

According to an aspect of embodiments of the present disclosure, an image display method is provided, which may include: responsive to a layer mirroring operation for layer-based mirroring of a display image being detected, a layer mirroring instruction is generated, the layer mirroring instruction including identification information of a layer to be mirrored; responsive to the layer mirroring instruction, a layer transmission interface is created for the layer to be mirrored; the layer mirroring instruction and information of the layer transmission interface are sent to a graphics composition thread; the graphics composition thread is triggered to send layer data of the layer to be mirrored to a multimedia module based on the identification information of the layer to be mirrored through the layer transmission interface, and the multimedia module renders and merges the layer data of the layer to be mirrored into image video data; and the image video data is output.

According to an aspect of embodiments of the present disclosure, an image display method is provided, which may include: responsive to a layer mirroring operation for layer-based mirroring of a display image being detected, a layer mirroring instruction and an image adjustment instruction are generated, the layer mirroring instruction including identification information of a layer to be mirrored; responsive to the layer mirroring instruction, a layer transmission interface is created for the layer to be mirrored; the layer mirroring instruction, the image adjustment instruction, and information of the layer transmission interface are sent to a graphics composition thread; the graphics composition thread is triggered to send layer data of the layer to be mirrored to a multimedia module based on the identification information of the layer to be mirrored through the layer transmission interface and send the image adjustment instruction to the multimedia module, and the multimedia module performs display parameter adjustment on the layer data of the layer to be mirrored based on the image adjustment instruction and renders and merges the layer data, subjected to the display parameter adjustment, of the layer to be mirrored into image video data; and the image video data is output.

According to an aspect of embodiments of the present disclosure, an image display device is provided, which may include: a processor and a memory for storing instructions executable by the processor. The processor may be configured to perform any one of the above methods.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
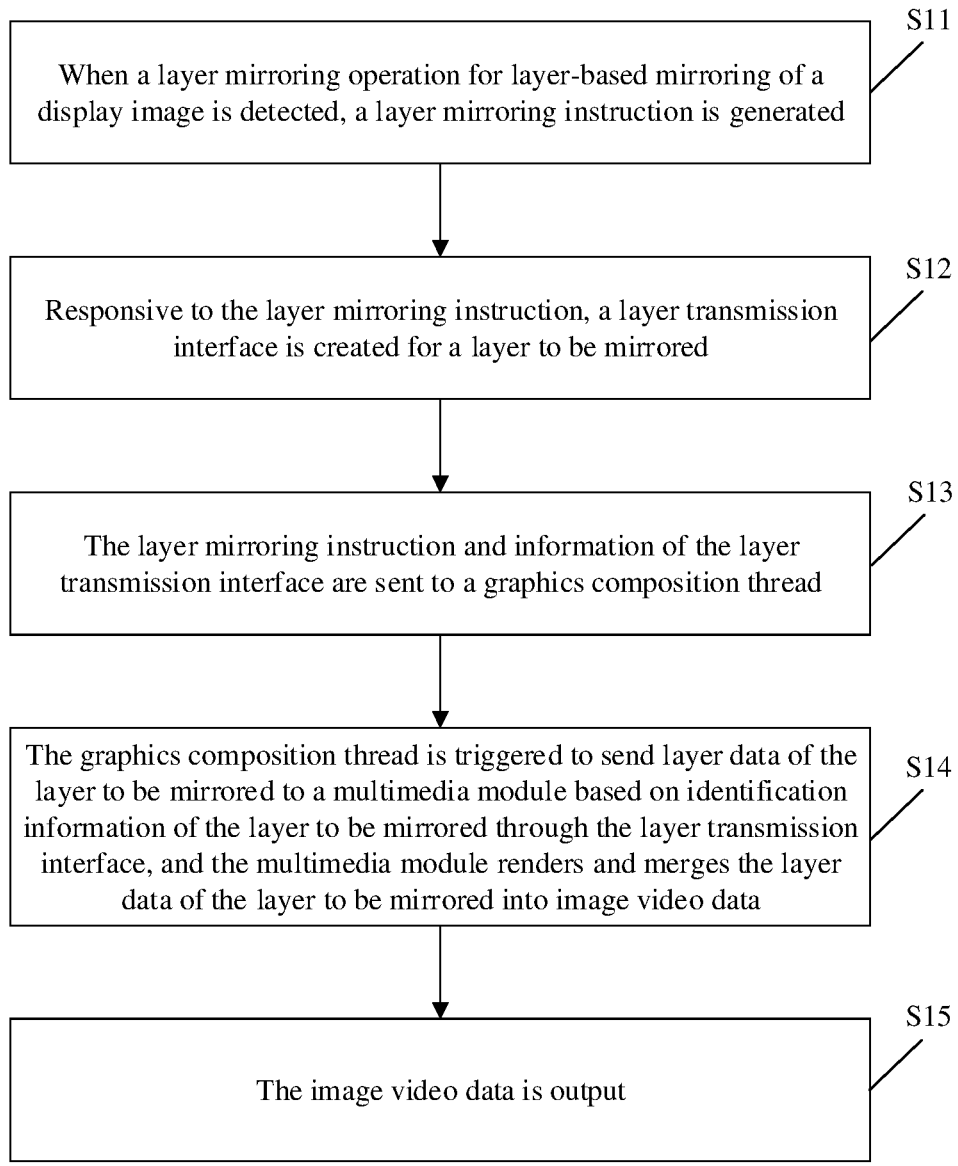
FIG. 1 is a first flow chart showing an image display method, according to an embodiment of the present disclosure.

FIG. 1 is a flow chart showing an image display method, according to an embodiment of the present disclosure. As illustrated in FIG. 1, the image display method of the embodiment of the present disclosure includes the following operations.

At S11, when a layer mirroring operation for layer-based mirroring of a display image is detected, a layer mirroring instruction is generated.

In the embodiment of the present disclosure, an electronic device may be a mobile phone, a gaming console, a wearable device, a virtual reality device, a personal digital assistant, a notebook computer, a tablet computer, a television terminal, or the like.

In a scenario of live broadcasting or screen sharing of the electronic device, a user executes an operation on a screen of the electronic device, for example, selecting an application to be broadcast live or an application to be shared. After the user selects an application to be projected, during projection or screen sharing, layer data of a display window of only the application selected by the user is transmitted to a communication object of the electronic device, and a display window of another application is not displayed to the communication object. When a selection operation of the user for a projection object is detected, a corresponding layer mirroring instruction is generated.

Herein, the operation may be an operation of the user for a set button provided by the electronic device. For example, a special projected screen selection button is set, and when the user opens an application window to be projected and presses the projected screen selection button, the present application window opened by the user is taken as a projection object, and projection to the communication object is not performed on another application window in the electronic device. Or, a combination of some buttons is set as a projected screen selection operation, or, the user clicks a set region on the screen of the electronic device to indicate that the user selects the application window to be projected.

In the embodiment of the present disclosure, the layer mirroring instruction includes identification information of a layer to be mirrored.

At S12, responsive to the layer mirroring instruction, a layer transmission interface is created for the layer to be mirrored.

Take the electronic device with an Android® system as an example, after the projected screen selection operation for the application is detected, the layer mirroring instruction is generated, the layer mirroring instruction is executed, Framework(s) may call a MediaProjection thread to create a Surface thread configured to transmit layer data to be mirrored selected for projection to a multimedia module, and the Surface is used as the layer transmission interface.

At S13, the layer mirroring instruction and information of the layer transmission interface are sent to a graphics composition thread.

In the embodiment of the present disclosure, the Framework(s), after acquiring the layer mirroring instruction, correspondingly send the layer mirroring instruction and information of the Surface to the graphics composition thread (SurfaceFinger).

In the embodiment of the present disclosure, the Framework(s) activate a DisplayManagerService thread, call the SurfaceFinger thread through the DisplayManagerService thread, and send the layer mirroring instruction and the information of the Surface to the SurfaceFinger for the multimedia module (Media) to acquire the mirrored layer data to be projected through the SurfaceFinger and perform processing such as rendering, merging, and the like on the layer data.

At S14, the graphics composition thread is triggered to send layer data of the layer to be mirrored to a multimedia module based on the identification information of the layer to be mirrored through the layer transmission interface, and the multimedia module renders and merges the layer data of the layer to be mirrored into image video data.

In the embodiment of the present disclosure, the SurfaceFinger may acquire the layer data to be projected in real time through the Surface, and the multimedia module (Media) acquires the mirrored layer data to be projected through the SurfaceFinger and performs processing such as rendering, merging, and the like on the layer data to generate the image video data.

At S15, the image video data is output.

In the embodiment of the present disclosure, the image video data processed by the multimedia module is output to a communication interface of the electronic device, and through the communication interface, the image video data selected for projection is transmitted to the communication object.

In the embodiment of the present disclosure, since only the application window to be projected that is selected by the user is transmitted to the communication object, when the user operates another application in the electronic device, the communication object may not perceive and may also not view image displaying during an operation of the user for the application that is not selected, and furthermore, the privacy of the electronic device is protected. Moreover, since only the image selected by the user for projection is transmitted, when a communication channel condition is relatively poor, the transmission quality of the image selected for projection is effectively ensured, the transmission efficiency of the electronic device is improved, and the processing power consumption of the electronic device is reduced.

In the embodiment of the present disclosure, adjustment of the image quality of a selected region of an image in a selected projected screen is also supported. That is, after the user selects the projected screen, the image quality of the set region in the image to be projected may further be adjusted. If the user wants an image of his/her own commodity to be displayed more clearly during live broadcasting, when the screen to be projected is selected, a display region of the commodity to be displayed is selected, and during display image projection, image enhancement may be performed on the region selected by the user, such that the display quality of the image display region selected by the user is higher, and a user watching the live broadcast may conveniently watch, for example, the displayed commodity more clearly. Of course, the live broadcasting user may also select some regions in the projected image for image weakening processing. For example, when the live broadcasting user does not want a certain region to be displayed to a live broadcasting object, the region for displaying weakening processing may be selected when the projected screen is selected, such that displaying weakening processing may be performed on the region selected by the user for weakening during projection.

That is, the user may perform image enhancement on a set region of a projected screen to be output, or perform blurring processing on the selected region, or decrease a display parameter of the selected region, etc.

Specifically, when an operation for a selected region of the display image is detected, an image adjustment instruction is generated, and the image adjustment instruction includes information of the selected region. When the layer mirroring instruction and the information of the layer transmission interface are sent to the graphics composition thread, the image adjustment instruction is sent.

When the Framework(s) trigger the graphics composition thread to send the layer data of the layer to be mirrored to the multimedia module, the image adjustment instruction is sent to the multimedia module. Before the layer data of the layer to be mirrored is rendered and merged into the image video data, the multimedia module performs display parameter adjustment on layer data of the selected region in the layer data.

The operation in which the display parameter adjustment is performed on the layer data of the selected region in the layer data includes: at least one of a brightness value, color contrast, or color tone contrast in a pixel parameter of the layer data of the selected region in the layer data being increased; or at least one of the brightness value, the color contrast, or the color tone contrast in the pixel parameter of the layer data of the selected region in the layer data being decreased; or a resolution of the layer data of the selected region in the layer data being decreased.

As an implementation mode, in the embodiment of the present disclosure, when the projected screen to be mirrored is selected, display parameter adjustment may further be performed on a display object in the image to be projected. For example, if the user wants his/her own portrait to be clearer during live broadcasting, an object to be adjusted for displaying may further be selected when the screen to be projected is selected, for example, the user selects the portrait. In such case, the multimedia module, when receiving the layer data to be projected, recognizes the object to be adjusted for displaying in the layer data based on the portrait selected by the user. For recognizing contrasts of some parts in the portrait and a peripheral region, after the object to be adjusted for displaying is recognized, image enhancement may be performed on a region where the portrait selected by the user is located during display image projection, so as to ensure higher display quality of the portrait region and cause the user watching the live broadcasting to see more clearly. Of course, the live broadcasting user may also perform image displaying weakening processing on the selected object in the projected image. For example, when the live broadcasting user selects to weaken a background, a background display region may be recognized from the layer data, and weakening adjustment may be performed on a display parameter of the background region to weaken displaying of the background region in a live broadcast image during live broadcasting.

Specifically, when a selection operation for the display object of the display image is detected, a display object image adjustment instruction is generated, and the display object image adjustment instruction includes feature information of the display object. When the layer mirroring instruction and the information of the layer transmission interface are sent to the graphics composition thread, the display object image adjustment instruction is sent.

When the Framework(s) trigger the graphics composition thread to send the layer data of the layer to be mirrored to the multimedia module, the display object image adjustment instruction is sent to the multimedia module. Before the layer data of the layer to be mirrored is rendered and merged into the image video data, the multimedia module searches the layer data for the display object based on the feature information of the display object and performs display parameter adjustment on layer data of a region where the recognized display object is located.

The operation in which the display parameter adjustment is performed on the layer data of the region where the recognized display object is located includes: at least one of a brightness value, color contrast, or color tone contrast in a pixel parameter of the layer data of the region where the recognized display object is located in the layer data being increased; or at least one of the brightness value, the color contrast, or the color tone contrast in the pixel parameter of the layer data of the region where the recognized display object is located in the layer data being decreased; or a resolution corresponding to the layer data of the region where the recognized display object is located in the layer data being decreased.

Figure 2:
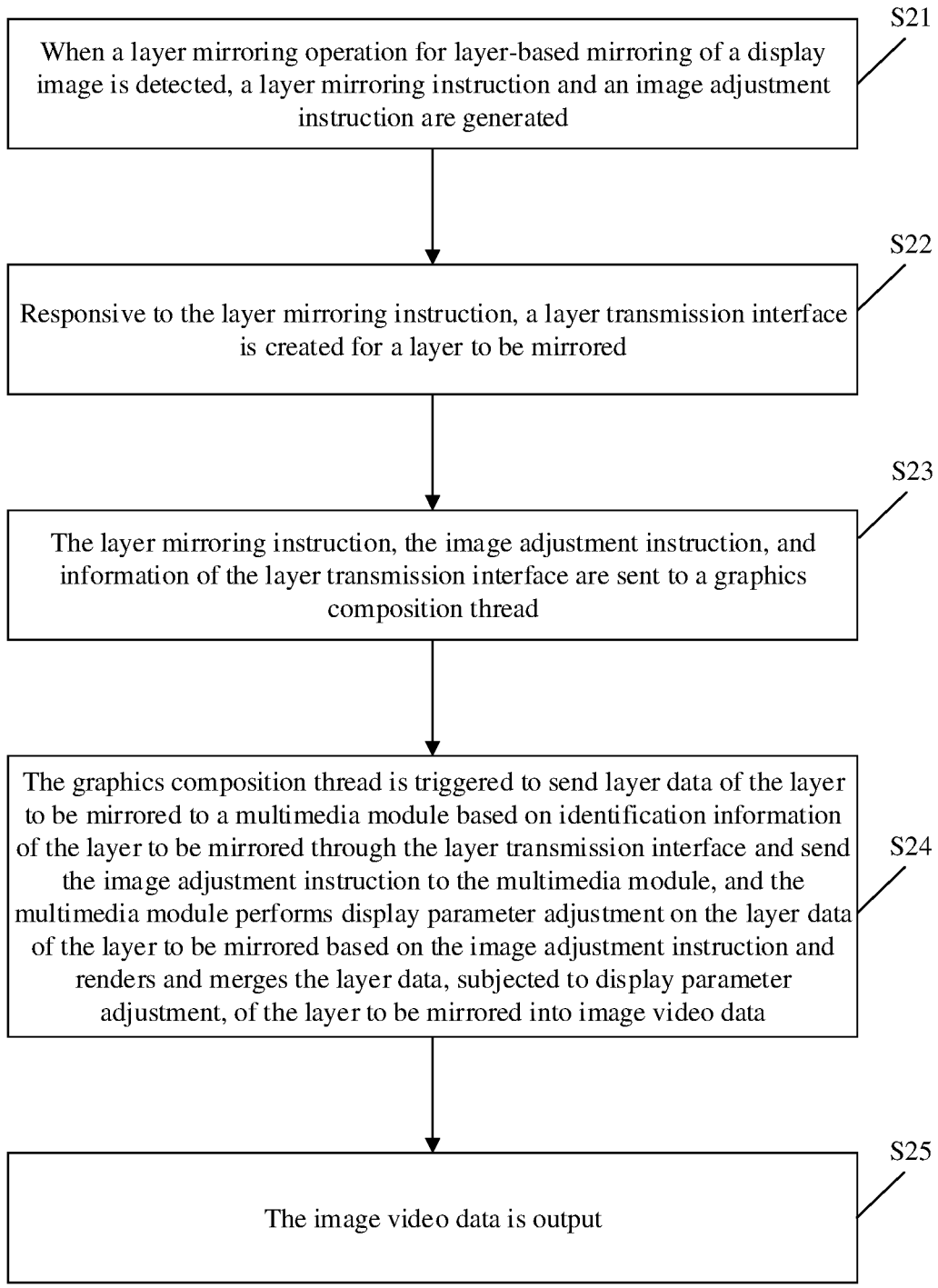
FIG. 2 is a second flow chart showing an image display method, according to an embodiment of the present disclosure.

FIG. 2 is a flow chart showing an image display method, according to an embodiment of the present disclosure. As illustrated in FIG. 2, the image display method of the embodiment of the present disclosure includes the following operations.

At S21, when a layer mirroring operation for layer-based mirroring of a display image is detected, a layer mirroring instruction and an image adjustment instruction are generated.

In the embodiment of the present disclosure, an electronic device may be a mobile phone, a gaming console, a wearable device, a virtual reality device, a personal digital assistant, a notebook computer, a tablet computer, a television terminal, or the like.

In a scenario of live broadcasting or screen sharing of the electronic device, a user executes an operation on a screen of the electronic device, for example, selecting an application to be broadcast live or an application to be shared. After the user selects an application to be projected, during projection or screen sharing, layer data of a display window of only the application selected by the user is transmitted to a communication object of the electronic device, and a display window of another application is not displayed to the communication object. When a selection operation of the user for a projection object is detected, a corresponding layer mirroring instruction is generated. Moreover, the user may perform display parameter adjustment on the whole projected image for a selected application window to be projected, that is, display adjustment such as enhancement, weakening, resolution decreasing, or the like is performed on the application window to be projected, such that the user may conveniently control the image to be projected.

Herein, the operation may be an operation of the user for a set button provided by the electronic device. For example, a special projected screen selection button is set, and when the user opens an application window to be projected and presses the projected screen selection button, the present application window opened by the user is taken as a projection object, and projection to the communication object is not performed on another application window in the electronic device. Or, a combination of some buttons is set as a projected screen selection operation, or, the user clicks a set region on the screen of the electronic device to indicate that the user selects the application window to be projected.

The layer mirroring instruction includes identification information of a layer to be mirrored.

At S22, responsive to the layer mirroring instruction, a layer transmission interface is created for the layer to be mirrored.

Take the electronic device with an Android® system as an example, after the projected screen selection operation for the application is detected, the layer mirroring instruction is generated, the layer mirroring instruction is executed, Framework(s) may call a MediaProjection thread to create a Surface thread configured to transmit layer data to be mirrored selected for projection to a multimedia module, and the Surface is used as the layer transmission interface.

At S23, the layer mirroring instruction, the image adjustment instruction, and information of the layer transmission interface are sent to a graphics composition thread.

In the embodiment of the present disclosure, the Framework(s), after acquiring the layer mirroring instruction and the image adjustment instruction, correspondingly send the layer mirroring instruction, the image adjustment instruction, and information of the Surface to the graphics composition thread (SurfaceFinger).

In the embodiment of the present disclosure, the Framework(s) activate a DisplayManagerService thread, call the SurfaceFinger thread through the DisplayManagerService thread, and send the layer mirroring instruction, the image adjustment instruction, and the information of the Surface to the SurfaceFinger for the multimedia module (Media) to acquire the mirrored layer data to be projected through the SurfaceFinger and perform processing such as rendering, merging, and the like on the layer data. The multimedia module (Media) may further perform display parameter adjustment on the acquired layer data based on the image adjustment instruction and perform processing such as rendering, merging, and the like on the adjusted layer data to generate image video data, thereby implementing projection to the communication object.

At S24, the graphics composition thread is triggered to send layer data of the layer to be mirrored to a multimedia module based on the identification information of the layer to be mirrored through the layer transmission interface and send the image adjustment instruction to the multimedia module. The multimedia module performs display parameter adjustment on the layer data of the layer to be mirrored based on the image adjustment instruction and performs rendering and merging on the layer data, subjected to the display parameter adjustment, of the layer to be mirrored into image video data.

In the embodiment of the present disclosure, the SurfaceFinger may acquire the layer data to be projected in real time through the Surface, and the multimedia module (Media) acquires the mirrored layer data to be projected through the SurfaceFinger, performs the display parameter adjustment on the layer data of the layer to be mirrored based on the image adjustment instruction, and then performs processing such as rendering, merging, and the like on the layer data subjected to the display parameter adjustment to generate the image video data.

At S25, the image video data is output.

In the embodiment of the present disclosure, the image video data processed by the multimedia module is output to a communication interface of the electronic device, and through the communication interface, the image video data selected for projection is transmitted to the communication object.

In the embodiment of the present disclosure, since only the application window to be projected that is selected by the user is transmitted to the communication object, when the user operates another application in the electronic device, the communication object may not perceive and may also not view image displaying during an operation of the user for the application that is not selected, and furthermore, the privacy of the electronic device is protected. Moreover, since only the image selected by the user for projection is transmitted, when a communication channel condition is relatively poor, the transmission quality of the image selected for projection is effectively ensured, the transmission efficiency of the electronic device is improved, and the processing power consumption of the electronic device is reduced.

The operation in which the multimedia module performs the display parameter adjustment on the layer data of the layer to be mirrored includes: at least one of a brightness value, color contrast, or color tone contrast in a pixel parameter of the layer data of the layer to be mirrored being increased; or at least one of the brightness value, the color contrast, or the color tone contrast in the pixel parameter of the layer data of the layer to be mirrored being decreased; or a resolution of the layer data of the layer to be mirrored being decreased.

In the embodiment of the present disclosure, the display parameter adjustment is performed by default on the whole layer of the projection object selected by the user.

Figure 3:
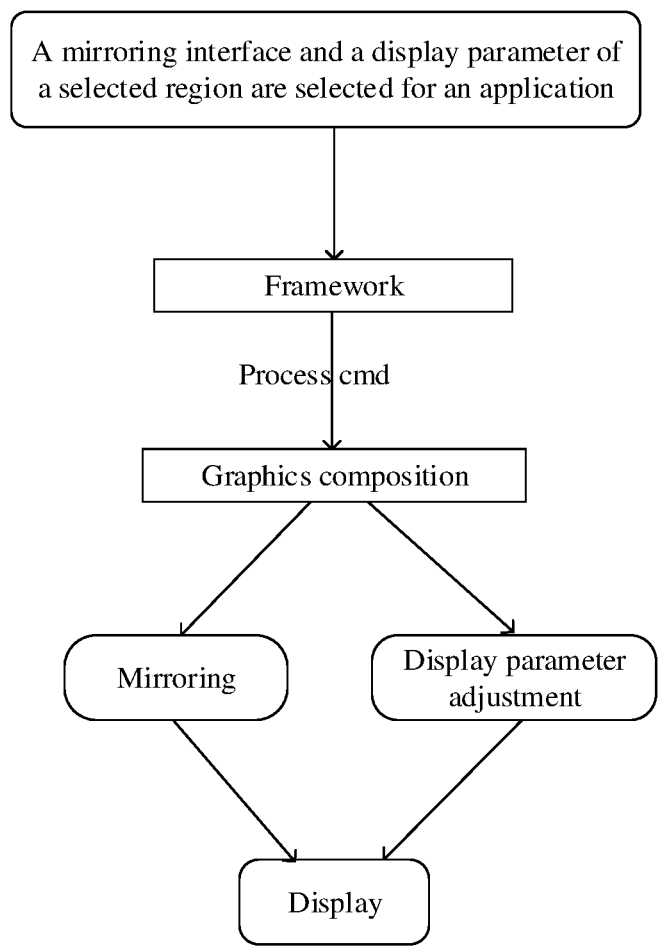
FIG. 3 is a block diagram of an image display device, according to an embodiment of the present disclosure.

FIG. 3 is a block diagram of an image display device, according to an embodiment of the present disclosure. As illustrated in FIG. 3, a user selects an application to be projected as well as a required display parameter adjustment value for a set region in an image to be projected in an electronic device through an operating button, a touch screen operation, or the like.

When an application window to be projected that is selected by the user is received, a corresponding Surface interface is selected for the application window to be projected that is selected by the user, and then Framework(s) may mirror layer data to be projected that is selected by the user through the Surface interface only.

The Framework(s) send the Surface interface and a region or display object selected by the user for display parameter adjustment to SurfaceFinger through a process instruction.

The SurfaceFinger mirrors the layer data to be projected that is selected by the user through the Surface interface.

A multimedia module acquires the layer data to be projected through the SurfaceFinger, acquires the region selected by the user for the display parameter adjustment or acquires the display object selected by the user for the display parameter adjustment, and performs the display parameter adjustment on the selected image region based on the display parameter adjustment value set by the user or adjusts a display parameter of the layer data for a display region where the display object selected by the user is located. After the display parameter adjustment, the multimedia module renders and merges the layer data to be projected into image video data and transmits the image video data to a communication object through a communication interface.

In the embodiment of the present disclosure, the display parameter adjustment includes: increasing of at least one of a brightness value, color contrast, or color tone contrast in a pixel parameter of the layer data; or decreasing of at least one of the brightness value, the color contrast, or the color tone contrast in the pixel parameter of the layer data; or decreasing of a resolution of the layer data.

Figure 4:
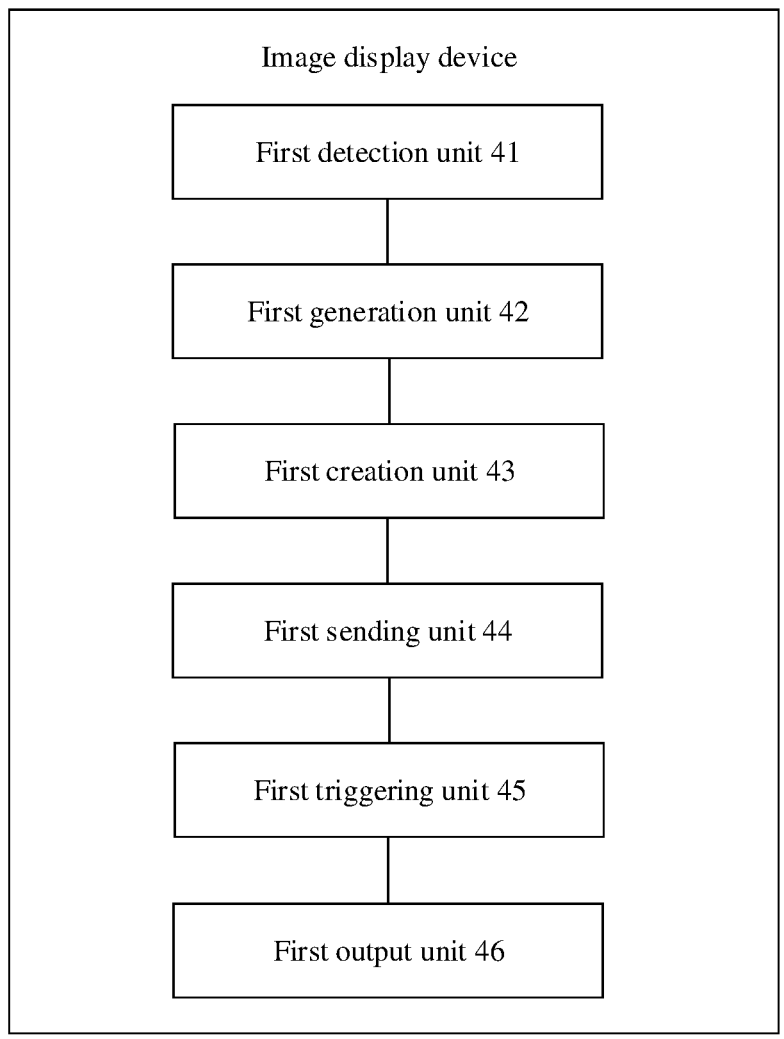
FIG. 4 is a composition structure diagram of an image display device, according to an embodiment of the present disclosure.

FIG. 4 is a composition structure diagram of an image display device, according to an embodiment of the present disclosure. As illustrated in FIG. 4, the image display device of the embodiment of the present disclosure includes: a first detection unit 41, a first generation unit 42, a first creation unit 43, a first sending unit 44, a first triggering unit 45, and a first output unit 46.

The first detection unit 41 is configured to detect a layer mirroring operation for layer-based mirroring of a display image.

The first generation unit 42 is configured to, when the layer mirroring operation is detected, generate a layer mirroring instruction, and the layer mirroring instruction includes identification information of a layer to be mirrored.

The first creation unit 43 is configured to, responsive to the layer mirroring instruction, create a layer transmission interface for the layer to be mirrored.

The first sending unit 44 is configured to send the layer mirroring instruction and information of the layer transmission interface to a graphics composition thread.

The first triggering unit 45 is configured to trigger the graphics composition thread to send layer data of the layer to be mirrored to a multimedia module based on the identification information of the layer to be mirrored through the layer transmission interface, and the multimedia module renders and merges the layer data of the layer to be mirrored into image video data.

The first output unit 46 is configured to output the image video data.

Optionally, the first detection unit 41 is further configured to detect an operation for a selected region of the display image. The first generation unit 42 is further configured to, when the first detection unit 41 detects the operation for the selected region, generate an image adjustment instruction, and the image adjustment instruction includes information of the selected region. The first sending unit 44 is further configured to, when the layer mirroring instruction and the information of the layer transmission interface are sent to the graphics composition thread, send the image adjustment instruction.

Optionally, the first triggering unit 45 is further configured to trigger the graphics composition thread to send the image adjustment instruction to the multimedia module. Before the layer data of the layer to be mirrored is rendered and merged into the image video data, the multimedia module performs display parameter adjustment on layer data of the selected region in the layer data.

Optionally, the multimedia module is further configured to: increase at least one of a brightness value, color contrast, or color tone contrast in a pixel parameter of the layer data of the selected region in the layer data; or decrease at least one of the brightness value, the color contrast, or the color tone contrast in the pixel parameter of the layer data of the selected region in the layer data; or decrease a resolution of the layer data of the selected region in the layer data.

Optionally, the first detection unit 41 is further configured to detect a selection operation for a display object of the display image. The first generation unit 42 is further configured to, when the first detection unit 41 detects the selection operation, generate a display object image adjustment instruction, and the display object image adjustment instruction includes feature information of the display object. The first sending unit 44 is further configured to, when the layer mirroring instruction and the information of the layer transmission interface are sent to the graphics composition thread, send the display object image adjustment instruction.

Optionally, the first triggering unit 45 is further configured to send the display object image adjustment instruction to the multimedia module. Before the layer data of the layer to be mirrored is rendered and merged into the image video data, the multimedia module searches the layer data for the display object based on the feature information of the display object and performs display parameter adjustment on layer data of a region where the recognized display object is located.

Optionally, the multimedia module is further configured to: increase at least one of a brightness value, color contrast, or color tone contrast in a pixel parameter of the layer data of the region where the recognized display object is located in the layer data; or decrease at least one of the brightness value, the color contrast, or the color tone contrast in the pixel parameter of the layer data of the region where the recognized display object is located in the layer data; or decrease a resolution corresponding to the layer data of the region where the recognized display object is located in the layer data.

With respect to the device in the above embodiments, the specific manners for performing operations for individual modules and units therein have been described in detail in the embodiments regarding the method, which will not be repeated herein.

Figure 5:
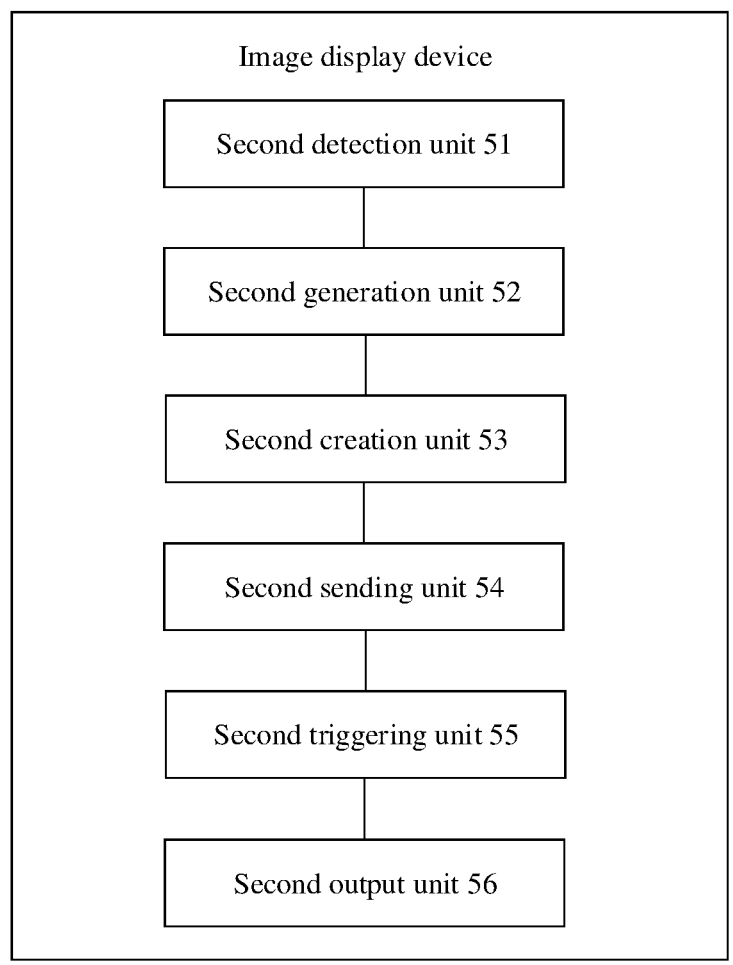
FIG. 5 is a composition structure diagram of an image display device, according to an embodiment of the present disclosure.

FIG. 5 is a composition structure diagram of an image display device, according to an embodiment of the present disclosure. As illustrated in FIG. 5, the image display device of the embodiment of the present disclosure includes: a second detection unit 51, a second generation unit 52, a second creation unit 53, a second sending unit 54, a second triggering unit 55, and a second output unit 56.

The second detection unit 51 is configured to detect a layer mirroring operation for layer-based mirroring of a display image.

The second generation unit 52 is configured to, when the layer mirroring operation is detected, generate a layer mirroring instruction and an image adjustment instruction, and the layer mirroring instruction includes identification information of a layer to be mirrored.

The second creation unit 53 is configured to, responsive to the layer mirroring instruction, create a layer transmission interface for the layer to be mirrored.

The second sending unit 54 is configured to send the layer mirroring instruction, the image adjustment instruction, and information of the layer transmission interface to a graphics composition thread.

The second triggering unit 55 is configured to trigger the graphics composition thread to send layer data of the layer to be mirrored to a multimedia module based on the identification information of the layer to be mirrored through the layer transmission interface and send the image adjustment instruction to the multimedia module. The multimedia module performs display parameter adjustment on the layer data of the layer to be mirrored based on the image adjustment instruction, and renders and merges the layer data, subjected to the display parameter adjustment, of the layer to be mirrored into image video data.

The second output unit 56 is configured to output the image video data.

Optionally, the multimedia module is further configured to: increase at least one of a brightness value, color contrast, or color tone contrast in a pixel parameter of the layer data of the layer to be mirrored; or decrease at least one of the brightness value, the color contrast, or the color tone contrast in the pixel parameter of the layer data of the layer to be mirrored; or decrease a resolution of the layer data of the layer to be mirrored.

In the embodiment of the present disclosure, the image display device illustrated in FIG. 5 performs the display parameter adjustment by default on the whole layer of a projection object selected by a user.

With respect to the device in the above embodiments, the specific manners for performing operations for individual modules and units therein have been described in detail in the embodiments regarding the method, which will not be repeated herein.

Figure 6:
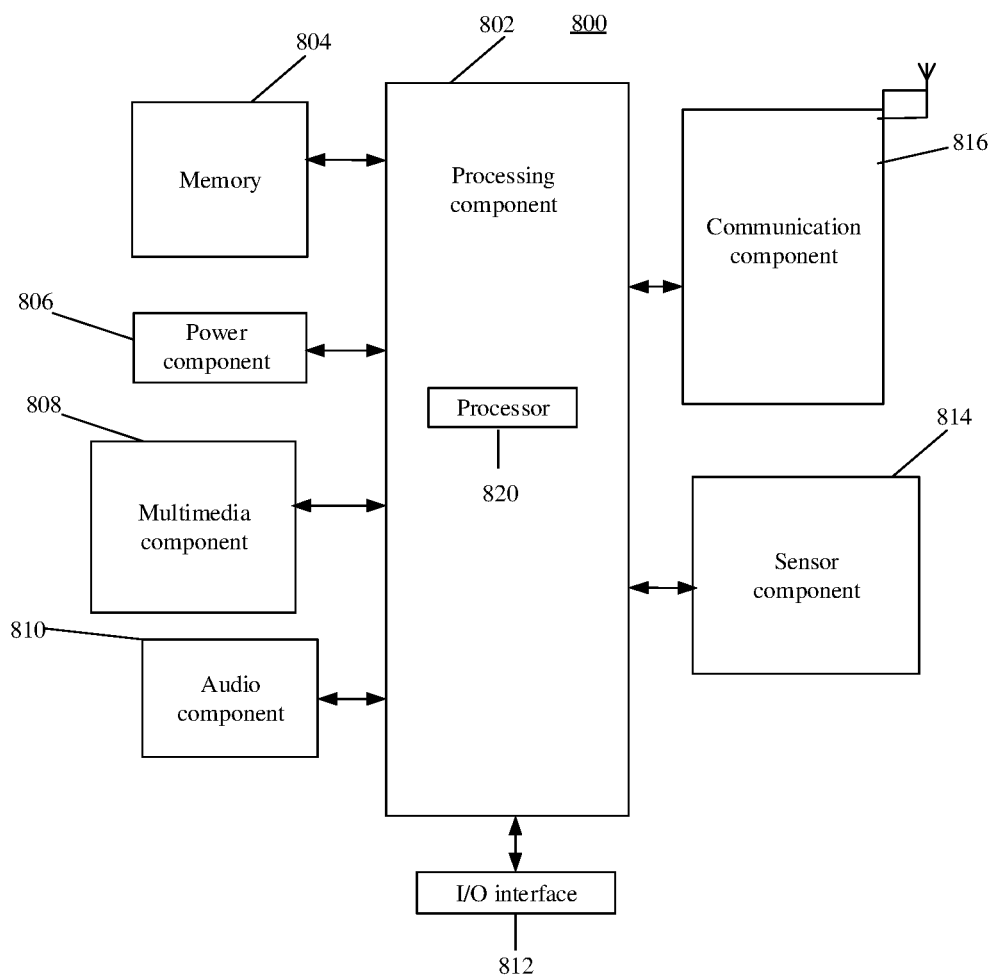
FIG. 6 is a block diagram of an electronic device, according to an embodiment of the present disclosure.

FIG. 6 is a block diagram of an electronic device 800, according to an embodiment of the present disclosure. As illustrated in FIG. 6, the electronic device 800 supports multi-screen output. The electronic device 800 may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the acts in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the electronic device 800. The power component 806 may include a power management system, one or more power supplies, and other components associated with generation, management, and distribution of power for the electronic device 800.

The multimedia component 808 includes a screen providing an output interface between the electronic device 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes, and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the electronic device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the electronic device 800 is in an operation mode, such as a call mode, a recording mode, and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button, and a locking button.

The sensor component 814 includes one or more sensors configured to provide status assessments in various aspects for the electronic device 800. For instance, the sensor component 814 may detect an on/off status of the electronic device 800 and relative positioning of components, such as a display and small keyboard of the electronic device 800, and the sensor component 814 may further detect a change in a position of the electronic device 800 or a component of the electronic device 800, presence or absence of contact between the user and the electronic device 800, orientation or acceleration/deceleration of the electronic device 800, and a change in temperature of the electronic device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application (APP). In some embodiments, the sensor component 814 may also include an acceleration sensor, a gyroscope sensor, a magnetic sensor, a pressure sensor, or a temperature sensor.

The communication component 816 is configured to facilitate wired or wireless communication between the electronic device 800 and other devices. The electronic device 800 may access a communication-standard-based wireless network, such as a wireless fidelity (WiFi) network, a 2nd-generation (2G) or 3rd-generation (3G) network, or a combination thereof. In an exemplary embodiment, the communication component 816 receives a broadcast signal or broadcast associated information from an external broadcast management system through a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the electronic device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, and is configured to execute an image display method for an electronic device in the abovementioned embodiments.

In an exemplary embodiment, there is also provided a non-transitory computer-readable storage medium including instructions, such as included in the memory 804, executable by the processor 820 of the electronic device 800, for performing an image display method for an electronic device in the abovementioned embodiments. For example, the non-transitory computer-readable storage medium may be a ROM, a random access memory (RAM), a compact disc read-only memory (CD-ROM), a magnetic tape, a floppy disc, an optical data storage device, and the like.

The embodiments of the present disclosure also provide a non-transitory computer-readable storage medium, instructions in the non-transitory computer-readable storage medium are executed by a processor of an electronic device to cause the electronic device to execute a control method, which includes: when a layer mirroring operation for layer-based mirroring of a display image is detected, a layer mirroring instruction is generated, the layer mirroring instruction including identification information of a layer to be mirrored; responsive to the layer mirroring instruction, a layer transmission interface is created for the layer to be mirrored; the layer mirroring instruction and information of the layer transmission interface are sent to a graphics composition thread; the graphics composition thread is triggered to send layer data of the layer to be mirrored to a multimedia module based on the identification information of the layer to be mirrored through the layer transmission interface, and the multimedia module renders and merges the layer data of the layer to be mirrored into image video data; and the image video data is output.

The embodiments of the present disclosure also provide a non-transitory computer-readable storage medium, instructions in the non-transitory computer-readable storage medium are executed by a processor of an electronic device to cause the electronic device to execute a control method, which includes: when a layer mirroring operation for layer-based mirroring of a display image is detected, a layer mirroring instruction and an image adjustment instruction are generated, the layer mirroring instruction including identification information of a layer to be mirrored; responsive to the layer mirroring instruction, a layer transmission interface is created for the layer to be mirrored; the layer mirroring instruction, the image adjustment instruction, and information of the layer transmission interface are sent to a graphics composition thread; the graphics composition thread is triggered to send layer data of the layer to be mirrored to a multimedia module based on the identification information of the layer to be mirrored through the layer transmission interface and send the image adjustment instruction to the multimedia module, and the multimedia module performs display parameter adjustment on the layer data of the layer to be mirrored based on the image adjustment instruction and renders and merges the layer data, subjected to the display parameter adjustment, of the layer to be mirrored into image video data; and the image video data is output.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An image display method, comprising:
generating, responsive to a layer mirroring operation for layer-based mirroring of a display image being detected, a layer mirroring instruction, the layer mirroring instruction comprising identification information of a layer to be mirrored;
creating, responsive to the layer mirroring instruction, a layer transmission interface for the layer to be mirrored;
sending the layer mirroring instruction and information of the layer transmission interface to a graphics composition thread;
triggering the graphics composition thread to send layer data of the layer to be mirrored to a multimedia module based on the identification information of the layer to be mirrored through the layer transmission interface;
rendering and merging, by the multimedia module, the layer data of the layer to be mirrored into image video data; and
outputting the image video data.

2. The method of claim 1, further comprising:
generating, responsive to an operation for a selected region of the display image being detected, an image adjustment instruction, the image adjustment instruction comprising information of the selected region; and
sending, responsive to the layer mirroring instruction and the information of the layer transmission interface being sent to the graphics composition thread, the image adjustment instruction.

3. The method of claim 2, further comprising:
sending, responsive to the graphics composition thread being triggered to send the layer data of the layer to be mirrored to the multimedia module, the image adjustment instruction to the multimedia module; and
before the layer data of the layer to be mirrored is rendered and merged into the image video data, performing, by the multimedia module, display parameter adjustment on layer data of the selected region in the layer data.

4. The method of claim 3, wherein performing the display parameter adjustment on the layer data of the selected region in the layer data comprises at least one of:
increasing at least one of a brightness value, color contrast, or color tone contrast in a pixel parameter of the layer data of the selected region in the layer data;
decreasing at least one of the brightness value, the color contrast, or the color tone contrast in the pixel parameter of the layer data of the selected region in the layer data;
or
decreasing a resolution of the layer data of the selected region in the layer data.

5. The method of claim 1, further comprising:
generating, responsive to a selection operation for a display object of the display image being detected, a display object image adjustment instruction, the display object image adjustment instruction comprising feature information of the display object; and
sending, responsive to the layer mirroring instruction and the information of the layer transmission interface being sent to the graphics composition thread, the display object image adjustment instruction.

6. The method of claim 5, further comprising:
sending, responsive to the graphics composition thread being triggered to send the layer data of the layer to be mirrored to the multimedia module, the display object image adjustment instruction to the multimedia module; and
before the layer data of the layer to be mirrored is rendered and merged into the image video data, searching, by the multimedia module, layer data for the display object based on the feature information of the display object and performing display parameter adjustment on layer data of a region where the display object is located.

7. The method of claim 6, wherein performing the display parameter adjustment on the layer data of the region where the display object is located comprises at least one of:
increasing at least one of a brightness value, color contrast, or color tone contrast in a pixel parameter of the layer data of the region where the display object is located in the layer data;
decreasing at least one of the brightness value, the color contrast, or the color tone contrast in the pixel parameter of the layer data of the region where the display object is located in the layer data; or
decreasing a resolution corresponding to the layer data of the region where the display object is located in the layer data.

8. An image display method, comprising:
generating, responsive to a layer mirroring operation for layer-based mirroring of a display image being detected, a layer mirroring instruction and an image adjustment instruction, the layer mirroring instruction comprising identification information of a layer to be mirrored;
creating, responsive to the layer mirroring instruction, a layer transmission interface for the layer to be mirrored;
sending, the layer mirroring instruction, the image adjustment instruction, and information of the layer transmission interface to a graphics composition thread;
triggering the graphics composition thread to send layer data of the layer to be mirrored to a multimedia module based on the identification information of the layer to be mirrored through the layer transmission interface; and
send the image adjustment instruction to the multimedia module;
performing, by the multimedia module, display parameter adjustment on the layer data of the layer to be mirrored based on the image adjustment instruction;
rendering and merging the layer data, subjected to the display parameter adjustment, of the layer to be mirrored into image video data; and
outputting the image video data.

9. The method of claim 8, wherein performing, by the multimedia module, the display parameter adjustment on the layer data of the layer to be mirrored comprises at least one of:
increasing at least one of a brightness value, color contrast, or color tone contrast in a pixel parameter of the layer data of the layer to be mirrored;
decreasing at least one of the brightness value, the color contrast, or the color tone contrast in the pixel parameter of the layer data of the layer to be mirrored; or
decreasing a resolution of the layer data of the layer to be mirrored.

10. An image display device, comprising:
a processor; and
a memory for storing instructions executable by the processor; wherein the processor is configured to:
detect a layer mirroring operation for layer-based mirroring of a display image;
responsive to the layer mirroring operation being detected, generate a layer mirroring instruction, the layer mirroring instruction comprising identification information of a layer to be mirrored;
responsive to the layer mirroring instruction, create a layer transmission interface for the layer to be mirrored;
send the layer mirroring instruction and information of the layer transmission interface to a graphics composition thread;
trigger the graphics composition thread to send layer data of the layer to be mirrored to a multimedia module based on the identification information of the layer to be mirrored through the layer transmission interface;
rendering and merging, by the multimedia module, the layer data of the layer to be mirrored into image video data; and
output the image video data.

11. The device of claim 10, wherein the processor is further configured to detect an operation for a selected region of the display image;
responsive to the operation for the selected region being detected, generate an image adjustment instruction, the image adjustment instruction comprising information of the selected region; and
responsive to the layer mirroring instruction and the information of the layer transmission interface being sent to the graphics composition thread, send the image adjustment instruction.

12. The device of claim 11, wherein the processor is further configured to trigger the graphics composition thread to send the image adjustment instruction to the multimedia module; and
the multimedia module is further configured to, before the layer data of the layer to be mirrored is rendered and merged into the image video data, perform display parameter adjustment on layer data of the selected region in the layer data.

13. The device of claim 12, wherein the multimedia module is further configured to at least one of:
increase at least one of a brightness value, color contrast, or color tone contrast in a pixel parameter of the layer data of the selected region in the layer data;
decrease at least one of the brightness value, the color contrast, or the color tone contrast in the pixel parameter of the layer data of the selected region in the layer data; or
decrease a resolution of the layer data of the selected region in the layer data.

14. The device of claim 10, wherein the processor is further configured to detect a selection operation for a display object of the display image;
responsive to the selection operation being detected, generate a display object image adjustment instruction, the display object image adjustment instruction comprising feature information of the display object; and
responsive to the layer mirroring instruction and the information of the layer transmission interface being sent to the graphics composition thread, send the display object image adjustment instruction.

15. The device of claim 14, wherein the processor is further configured to send the display object image adjustment instruction to the multimedia module; and
the multimedia module is further configured to, before the layer data of the layer to be mirrored is rendered and merged into the image video data, search layer data for the display object based on the feature information of the display object and perform display parameter adjustment on layer data of a region where the display object is located.

16. The device of claim 15, wherein the multimedia module is further configured to at least one of:

increase at least one of a brightness value, color contrast, or color tone contrast in a pixel parameter of the layer data of the region where the display object is located in the layer data;

decrease at least one of the brightness value, the color contrast or the color tone contrast in the pixel parameter of the layer data of the region where the display object is located in the layer data; or decrease a resolution corresponding to the layer data of the region where the display object is located in the layer data.

* * * * *